June 6, 1967   G. E. MATHER   3,323,785
SPRING
Filed Sept. 10, 1964
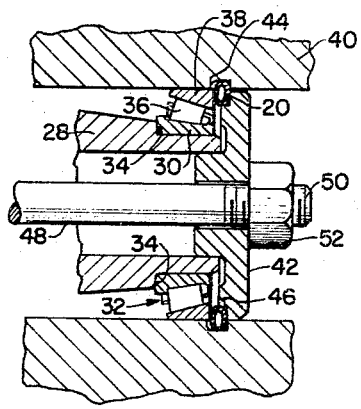
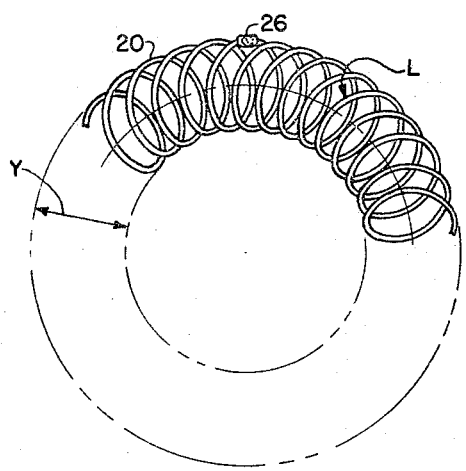
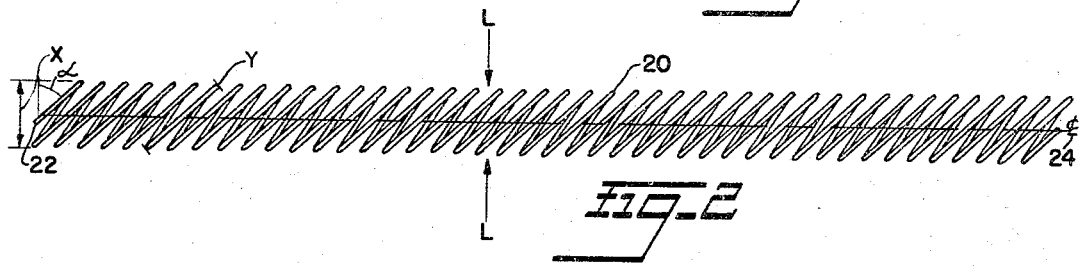
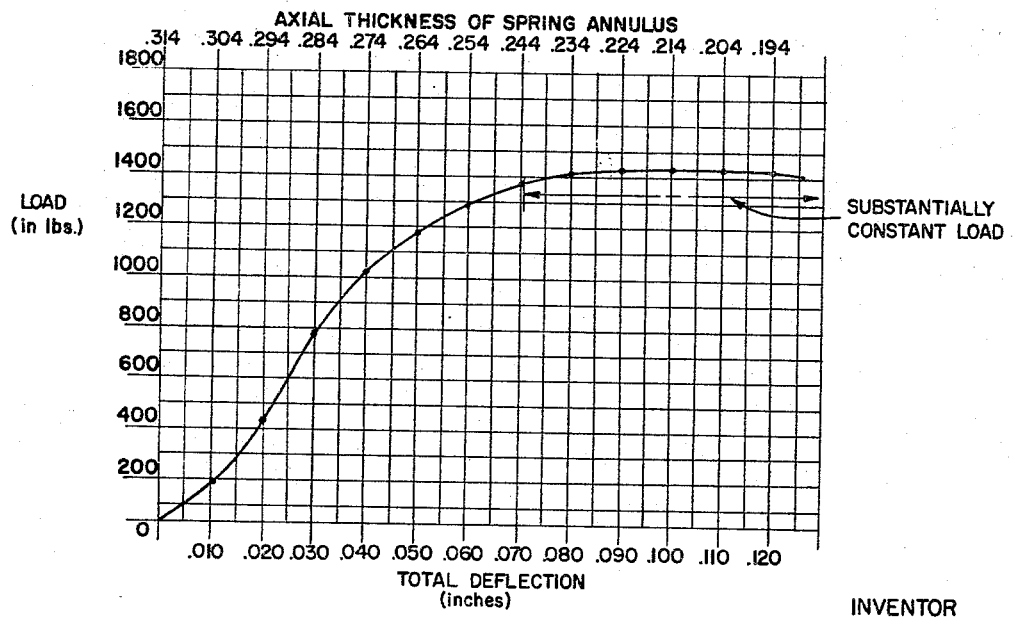
INVENTOR
GLENN E. MATHER
Strauch, Nolan & Neale
ATTORNEYS United States Patent Office 3,323,785
Patented June 6, 1967

3,323,785
SPRING
Glenn E. Mather, Logansport, Ind., assignor to Rockwell-Standard Corporation, Pittsburgh, Pa., a corporation of Delaware
Filed Sept. 10, 1964, Ser. No. 395,363
5 Claims. (Cl. 267—1)

The present invention pertains to a new article of manufacture in the art of spring devices and more specifically to a resilient annular member comprising an endless coil spring.

In many applications it is required to resiliently retain or support two coaxial members which may be movable relative to each other. This is usually accomplished by the use of such devices as spacers, washers, retaining rings etc., which axially space or secure a member in relation to an associated shaft. In certain instances these devices must be capable of exerting an axial force on either one or both of the coaxial members. The device should preferably have sufficient elasticity so that it will be able to resiliently yield upon the application of a greater force without being permanently distorted.

In other applications, these spaces, washers etc. must absorb a substantial number of axial shock loads due to periodic working movements between the two co-axial members.

Prior to the present invention such requirements for resiliency of spacers, washers, retaining rings etc. have largely been met by plate type springs such as Belleville springs, wave washers, or other similar axially resilient members. However these known axial spring members have certain inherent deficiencies in addition to their high cost of manufacture which seriously restrict their application. Among these deficiencies is the inability to control the resistance to deflection under varying amounts of deflection and to maintain the stored energy (load) of the resilient member substantially constant over a relatively wide range of deflection.

The present invention provides a novel axially resilient annular member which accomplishes the above requirements comprising an annular coiled spring which is both axially and radially deflectable and which may be subjected to axial forces without damage. The novel spring device of this invention also provides a substantially constant resistance to deflection within a given range of deflection.

Annular coiled springs are known in the art and are used for various purposes such as the garter or expander type springs shown in United States Patent No. 2,991,064 to D. C. De Jean. However, these annular springs are for the purpose of radial expansion and contraction only.

It is also known in the art to use an annular coiled spring as a retainer between a shaft and another co-axial member as disclosed in United States Patent No. 2,255,217 to H. C. Hill. Although the coiled spring retainer of the Hill patent is subjected to slight axial loads, the resistance to deflection cannot be held constant over a given range of deflection. Furthermore, when subjected to axial loads the coils of Hill's spring expand radially thereby changing the diameter of the coiled spring annulus necessitating an oversize groove for the annulus.

In this invention the novel coiled spring annulus has coils arranged so they will not be deformed when subjected to loads in the axial direction of the annulus, thus the diameter of the annulus will not be changed under axial load.

Accordingly, it is the main object of this invention to provide a novel coiled spring annulus for use as an axially loaded spring element, washer, retainer, spacer and the like which has a substantially constant spring resistance to deflection within a given range of deflection, and which does not expand radially when subjected to axial loads.

Another object of the present invention resides in the provision of an annulus of coiled spring wire in which the coils are so arranged that the axial thickness of the annulus is considerably less than the diameter of an individual coil.

A further object of the present invention is to provide a novel annular spring capable of absorbing or exerting axial force and which is formed from a length of coiled spring wire in which the coils are slanted relative to the axis of the coiled spring and formed into an annulus by suitably attaching the opposite ends of the spring to each other.

A further object is to provide a coiled spring having its coils disposed substantially parallel to each other at an oblique angle to the axis of the spring.

Other objects and novel features will become apparent as the following detailed description proceeds in connection with the appended drawings in which:

FIGURE 1 is a plan view of the annular coil spring of the present invention;

FIGURE 2 shows an unloaded length of coil spring from which the annulus of FIGURE 1 is made;

FIGURE 3 is a sectional view showing the novel annular coil spring installed as a pre-load spacer for a bearing; and FIGURE 4 is a graph illustrating the performance for a specific spring of this invention.

Referring now to the drawings, FIGURE 1 illustrates a resilient ring 20 which is an annular coil spring formed from a length of coiled spring wire. The coil spring of the present invention has its coils so arranged that each coil lies in an oblique plane to the longitudinal axis of the spring and the coils are substantially folded upon each other. This is accomplished, as shown in FIGURE 2, without deforming the individual coils.

After the length of coil spring has been formed to the configuration shown in FIGURE 2, it is formed into an annulus in a plane containing the longitudinal center line of the spring and the opposite ends 22 and 24 are welded, brazed or soldered together as at 26. The ends may also be joined mechanically such as by clips, plugs or interference fit between the coils.

The axial flattening of the annular spring is due to folding of the coils upon each other and not due to distorting of the original diameter of the coils.

The annular spring has a thickness X which is a function of the angle of slant of the convolutions (FIGURE 2). Angle of slant $\alpha$ is the angle formed by the intersection of the planes containing the diameters of the individual coils with a plane normal to the axis of the coil spring as shown in FIGURE 2. The cosine of $\alpha$ equals the axial thickness X divided by the radial width Y of the annulus. Consequently, thickness X is considerably less than the diameter Y of any given convolution of the spring. The angle of slant also determines the resiliency and energy-storing capacity of the spring when a load is applied to the coils in the direction of the arrows indicated by the letter L. Angle $\alpha$ may be varied from 35–55 degrees and still provide greatly increased resiliency and energy-storing capacity for the spring. It has been determined that the optimum angle of slant is about 45 degrees.

FIGURE 3, to which detailed references will now be made, illustrates an environment in which the coil spring of FIGURE 2 may be used with particular advantage.

FIGURE 3 illustrates a bearing assembly for a rotating shaft or housing 28 supported at one end in the inner race 30 of an antifriction bearing 32 which axially abuts against a shoulder 34. Bearing 32 is completed by rollers 36 positioned between the inner race 30 and a complimentary outer race 38 which is held against stationary member 40.

Normally, bearings, such as bearing 32, must be provided with a preload to assure true running and long life.

In this example, pre-loading of the bearing 32 is accomplished by tightening a bearing cap 42 against resilient ring 20 which is positioned in an annular passage formed by groove 44 of stationary member 40 and annular recess 46 in cap 42. Ring 20 abuts against outer race 38 of bearing 32. Cap 42 is provided with a rod or bolt 48 extending therethrough which may be suitably fastened at one end and provided at the other end with threads 50 to receive a nut 52 for tightening cap 42.

From the foregoing description and illustration in FIGURE 3, it will be clear that when nut 52 is tightened, cap 42 is axially displaced along bolt 48 towards bearing 32 exerting an axial force on resilient ring 20 which is transferred through the ring to outer race 38 of the bearing. This force is counteracted by shoulder 34 against which inner race 30 abuts; thus, axially pre-loading bearing 32. The amount of pre-load will, of course, depend on the torque applied to nut 52 and the compressibility and energy storing capacity of the resilient ring 20. Due to its resiliency the ring 20 absorbs any axial shock loads received by bearing 32 in the normal course of operation. Early failure of the bearing due to periodic overloading is thus prevented.

The excellent energy storing capacity of this spring and its ability to maintain a substantially constant resistance to deflection during a certain range of deflection are graphically illustrated in FIGURE 4 based on tests with an annular spring of the following dimensions:

| | |
|---|---|
| Wire diameter | inch .047 |
| Radial height (dimension "Y") | do .385 |
| Axial thickness (dimension "X") | do .314 |
| Coils per inch | 7.3 |
| Diameter ring | inches 7.5 |
| Angle of slant ($\alpha$) | 35°22′ |

In this example, after initial axial compression amounting to a total deflection of about .07″, the resistance of the spring to further compression remained substantially constant at about 1400 lbs. plus or minus 40 lbs. By varying the parameters given above the constant resistance to deflection within a given range of deflection can be varied accordingly to suit different applications.

The present invention, therefore, provides an annular coiled spring which does not expand radially when compressed and which exerts a substantially constant resistance to deflection over a predetermined range of deflection.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A resilient annulus comprising a series of interconnected coils, said coils being formed so that when said annulus is unloaded said coils are slanted at an oblique angle of at least 35° to the axis of said annulus, said annulus thereby being effective, within a predetermined range of deflection, to exert substantially constant resistance to deflection under loads applied axially of said annulus and the dimension of said annulus in the direction parallel with the axis of said annulus being substantially unchanged under the application of such loads.

2. The resilient annulus of claim 1 wherein said angle is from 35 to 55 degrees.

3. The resilient annulus of claim 1 wherein said angle is 45 degrees.

4. A resilient annulus for installation between two members adapted to be relatively moved in a direction parallel with the axis of said annulus under varying loads, said annulus being formed by joining the ends of an essentially straight coil spring in which the coils are substantially parallel, the planes of the coils each being inclined at an angle to the axis of said spring and the angle of the coils in said annulus with respect to the axis of said annulus being the complement of the angle of the coils in said spring with respect to axis of said spring to provide a substantially constant resistance to deflection within a given range of deflection under varying loads applied axially of the annulus.

5. The resilient annulus according to claim 4 wherein the angle of the coils in said annulus is between 35° and 55°.

References Cited

UNITED STATES PATENTS 2,859,033  11/1958  Rose _____ 308—189.1
3,053,543  9/1962  Kallin _____ 277—163 X MARTIN P. SCHWADRON, *Primary Examiner.*

FRANK SUSKO, *Examiner.*

UNITED STATES PATENT OFFICE
CERTIFICATE OF CORRECTION

Patent No. 3,323,785                      June 6, 1967

Glenn E. Mather

It is hereby certified that error appears in the above numbered patent requiring correction and that the said Letters Patent should read as corrected below.

Column 4, line 20, for "parallel" read -- normal --.

Signed and sealed this 22nd day of October 1968.

(SEAL)
Attest:

Edward M. Fletcher, Jr.                     EDWARD J. BRENNER
Attesting Officer                          Commissioner of Patents